J. N. WILKINS.
Oil-Can Holders.
No. 128,517.
Patented July 2, 1872.
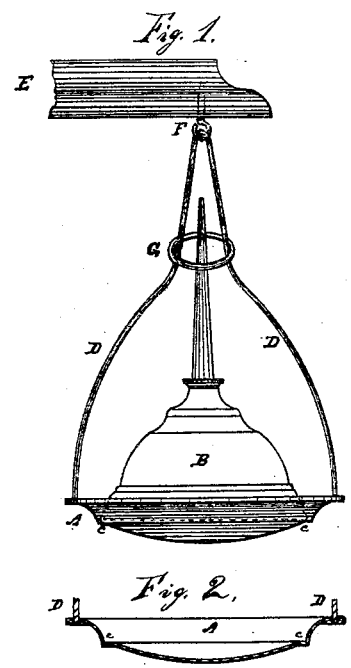
WITNESSES
Preston Brady
F. F. Warner.
INVENTOR
John N. Wilkins 128,517

UNITED STATES PATENT OFFICE.

JOHN N. WILKINS, OF CHICAGO, ILLINOIS.

IMPROVEMENT IN OIL-CAN HOLDERS.

Specification forming part of Letters Patent No. 128,517, dated July 2, 1872.

SPECIFICATION.

*To all whom it may concern:*

Be it known that I, JOHN N. WILKINS, of Chicago, in the county of Cook and State of Illinois, have invented certain new and useful Improvements in Oil-Can Holders, for attachment to sewing-machines and for similar purposes, of which improved device the following is a full, clear, and exact description, which will enable others skilled in the art to which my invention appertains to make and use the same, reference being had to the accompanying drawing forming a part thereof, in which—

Figure 1 represents my improved oil-can-holding device with the oil-can therein, and illustrating the manner in which I propose to attach the oil-can holder to a sewing-machine; and Fig. 2, a vertical central sectional view of the same through the bottom part thereof.

An oil-can is a necessary accompaniment to a sewing-machine, and as more or less oil finds its way to the outer side and bottom of the oil-can, considerable care in its use is required in order not to soil the fabric being sewed. For this reason it is not only desirable to provide a convenient place for the oil-can, but to make its receptacle such that the oil-can may be readily placed therein and removed. It is also desirable that the oil-can shall not be capable of being accidentally removed from its position. In placing the oil-can always in the same place a considerable amount of oil will eventually there accumulate, unless great care is used.

The object of my invention is to provide a receptacle for the oil-can which shall embrace these desirable features, and more effectually prevent the accumulated oil from adhering to the oil-can. To that end my invention consists in providing a dish-shaped receptacle for the oil-can, the dish having a horizontal annular shoulder or shelf somewhat above the deepest part of the dish, on which shelf the oil-can may rest, and from which the oil will drip into the deepest part of the dish, so as not to be capable of thereafter adhering to the oil-can. This dish I suspend from any convenient place, and in order to prevent the oil-can from being accidentally removed I form the suspending loop approximately to the profile of the oil-can, and arrange a ring over the loop, so that the point of the oil-can will pass through the ring. By this means the oil-can may be readily placed in and removed from its receptacle, when desirable, and prevented from being removed therefrom by accident.

In the drawing, A represents the dish-shaped receptacle, and B the oil-can resting therein. c is a shoulder or shelf, projecting horizontally from the inner side of the receptacle A, somewhat above the bottom of the latter, as shown, and this shelf supports the oil-can B. If desirable, this shelf may be made to descend slightly toward the center of the bottom of the dish A, so that the accumulated oil will be more readily drained therefrom into the deepest part of the dish. D is a wire loop, rigidly attached to the dish A, by means of which loop the dish is suspended from any convenient place—for example, from the under side of a sewing-machine table, such a table being represented by E. F is an eye, into which the loop D is inserted, the former being screwed into the table, as shown. G is a ring, freely surrounding the loop D, so as to form a guard for the oil-can B. In order to remove the oil-can from the dish the can is raised until its bottom is above the top of the dish; it can then be readily withdrawn from the ring. To replace the can in the dish, the point of the former is inserted through the ring, and the can then set on the shelf c; or the ring may be raised and lowered in order to remove and replace the can.

Having thus described the nature, object, and construction of my invention, what I claim as new, and desire to secure by Letters Patent, is—

The combination, with the receptacle A and loop D suspending the same, of the ring G, substantially as and for the purpose specified.

JOHN N. WILKINS.

Witnesses:
F. F. WARNER,
N. C. GRIDLEY.